Figure 1:
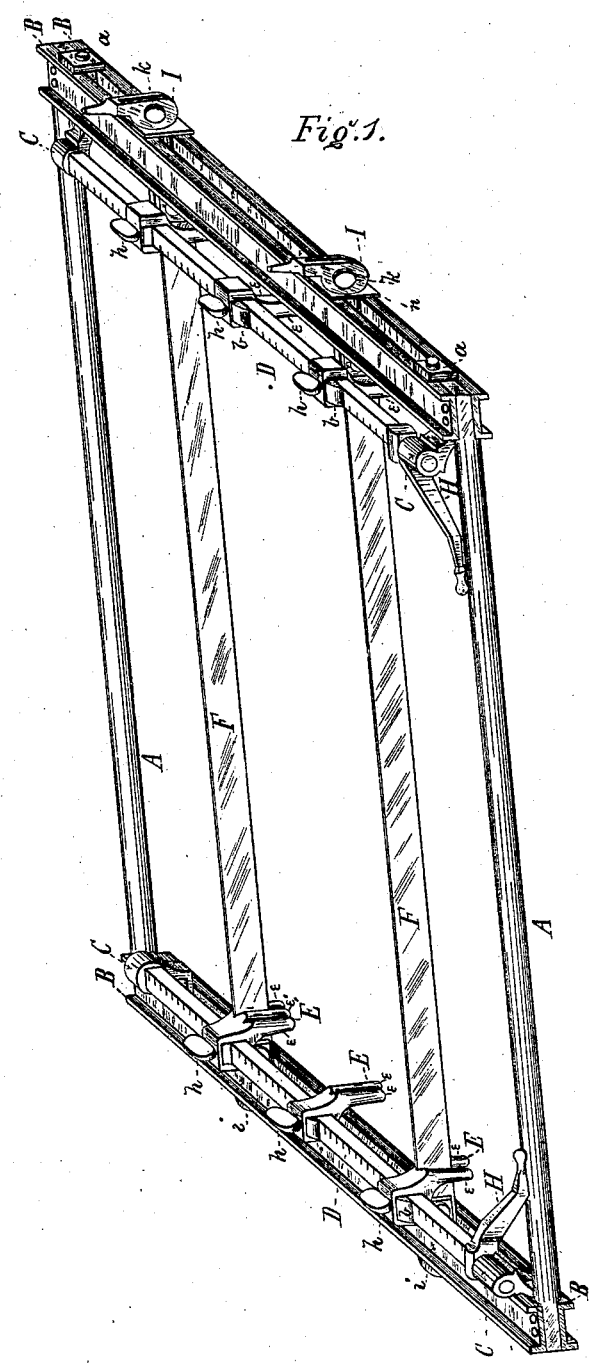

(No Model.)

2 Sheets—Sheet 1.

J. P. BROUNSCOMBE.
STONE SAW RACK.

No. 293,942. Patented Feb. 19, 1884.

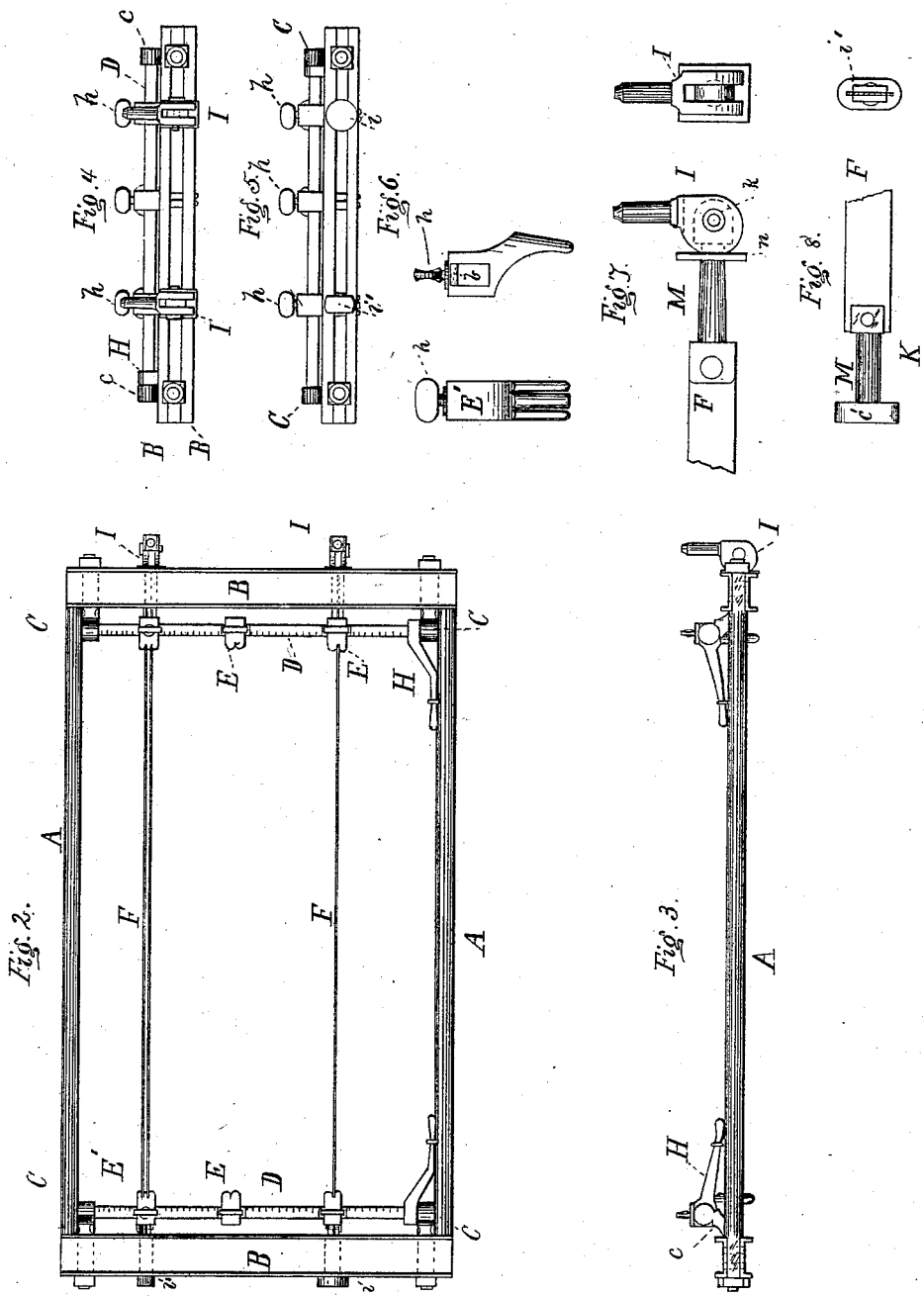

UNITED STATES PATENT OFFICE.

JOHN P. BROUNSCOMBE, OF WILKES-BARRÉ, PENNSYLVANIA.

STONE-SAW RACK.

SPECIFICATION forming part of Letters Patent No. 293,942, dated February 19, 1884.

Application filed May 1, 1882. (No model.)

*To all whom it may concern:*

Be it known that I, JOHN P. BROUNSCOMBE, a citizen of the United States, residing at Wilkes-Barré, in the county of Luzerne and State of Pennsylvania, have invented a new and useful Stone-Saw Rack, of which the following is a specification.

My invention relates to improvements in stone-saw racks in which two or more saws are mounted in parallel planes; and the objects of my invention are, first, to provide for an easy adjustment of the saws to any desired position; second, to provide means for securely locking the saws when placed in position; and, third, to provide means by the use of which either edge of the saw may be presented for use when the saw has been once mounted in the rack. I attain these objects by the mechanism illustrated in the accompanying drawings, in which—

Figure 1 is a view in perspective of my improved saw-rack. Fig. 2 is a top view of the rack. Fig. 3 is a side elevation. Fig. 4 is an end view, showing the eccentrics by which the saws are tightened and locked in position. Fig. 5 is a view of the opposite end of the rack, and Figs. 6, 7, and 8 are views in detail of specific parts.

Similar letters refer to similar parts throughout the several views.

The saw rack or frame *per se* is made up of the connecting-rods A A and the double angle-irons B B, two of such angle-irons being used at each end of the frame, and having the ends of the connecting-rods, which are squared, securely bolted between them, as clearly shown in Fig. 1.

Immediately adjacent to the ends of the rods A A, I secure the brackets C C by means of the nuts $a\ a$, threaded to engage with a screw-thread on the end of the bracket-shank, which shank passes between the angle-irons. These brackets serve as bearings for two graduated bars, D D, which pass through and support the finger-guides E E E'. The finger-guides are provided with two or more dependent lugs or fingers, $e\ e$, between which are spaces adapted to receive and hold the saws F F in position preparatory to their being firmly locked for use, as will be more fully set forth. The slots in the finger-guides, through which the bars D pass, are made large enough for the introduction of spring-friction grip-pieces $b$, and in the upper sides of the finger-guides there are threaded holes, in which thumb-screws $h\ h$ are mounted. By turning these thumb-screws "home," the finger-guides are firmly locked to the bars D.

To one end of each bar D, I rigidly attach a lever-arm, H, by means of which the bars D may be partially rotated in their bearings and the finger-guides E thrown up out of engagement with the saws, in which position the said finger-guides can be adjusted to any desired place on the graduated bars D, it being understood that the thumb-screws $h\ h$ are first turned loose. Short round rods M and M', only slightly longer than the angle-irons B are wide, pass through the spaces between said angle-irons, and in conjunction with other devices serve as the supports for the saws. There are two sets of these rods M and M', one at each end of the frame, and the inner ends of both sets are alike, being provided with U-shaped stirrups K, adapted to receive the ends of the saws, which are fastened thereto by means of bolts passing through the saw ends and both arms of the stirrup, as seen in Fig. 7. To the outer ends of one set of these bars I affix the buttons $i\ i'$, (seen in Figs. 2 and 5,) while to the outer ends of the other set I attach the eccentrics I I by means of the bolts $k$. The eccentrics I bear on plates $n$, through which the bars M pass, said plates in turn bearing against the angle-irons B, as seen in Fig. 1.

Having thus described the construction of my improved stone-saw rack, I will now proceed to state how the same is used. The saws F having been bolted to the stirrups K, and the width of the slab of stone to be cut determined, the finger-guides E are adjusted to the desired width by means of the scale on the bar D, to which bar they are then secured by tightening the thumb-screws. The saws are then placed in line with the spaces in the finger-guides, which are intended to receive them. The bar D is turned over so that the lugs of the finger-guides bear down, one upon either side of each saw. The eccentrics I are then turned down and the saws are ready for use. When one edge of the saw has become worn or it is desired to reverse the saw the bars D are partially turned over, so that the finger-guides are thrown out of engagement with the saws. The eccentrics are loosened, and when the parts are in this position the saws can easily be reversed, the necessary leverage being obtained through the handles of the eccentrics.

When very thin slabs of stone are to be cut, I employ finger-guides having three or more dependent lugs properly spaced. In this case a single finger-guide receives and holds two or more saws, and buttons of the shape seen at $i'$, Fig. 5, are employed. An example of this style of guide is shown at $E'$, Fig. 1, and in Fig. 6.

Having fully described my invention, what I claim as new, and desire to secure by Letters Patent, is—

1. The fingers E, slotted to receive a saw or saws, and adapted to hold the same in position, in combination with the graduated bar D, and means for securing said fingers upon the said bar, substantially as herein set forth.

2. In a stone-saw rack, the graduated bars D D, capable of being rocked in their bearings, and carrying adjustable fingers, as E, each of the latter having one or more slots for receiving a saw or saws, in combination with the frame, and with means for securing the ends of the saws, substantially as described.

JOHN P. BROUNSCOMBE.

Witnesses:
T. E. TOMLINSON, Jr.,
WILLIAM W. PALMER.